United States Patent
Prancz

(10) Patent No.: US 6,170,880 B1
(45) Date of Patent: Jan. 9, 2001

(54) DATA CARRIER WITH A MODULE AND A HOLOGRAM

(75) Inventor: Markus Prancz, Vienna (AT)

(73) Assignee: Austria Card Plastikkarten und Aussweissysteme Gesellschaft m.b.H., Vienna (AT)

( * ) Notice: Under 35 U.S.C. 154(b), the term of this patent shall be extended for 0 days.

(21) Appl. No.: 09/214,888

(22) PCT Filed: Jan. 22, 1998

(86) PCT No.: PCT/IB96/00693

§ 371 Date: Jan. 14, 1999

§ 102(e) Date: Jan. 14, 1999

(87) PCT Pub. No.: WO98/02849

PCT Pub. Date: Jan. 22, 1998

(51) Int. Cl.[7] .................................................. B42D 15/00
(52) U.S. Cl. ........................... 283/86; 235/457; 235/492; 283/91; 428/913.3; 428/916
(58) Field of Search ................. 283/86, 91, 904; 428/913.3, 916; 235/457, 492

(56) References Cited

U.S. PATENT DOCUMENTS

| | | | |
|---|---|---|---|
| 4,014,602 | * | 3/1977 | Ruell ........................................ 350/3.5 |
| 4,641,017 | * | 2/1987 | Lopata ...................................... 235/457 |
| 4,684,795 | * | 8/1987 | Colgate, Jr. ............................. 235/457 |
| 4,945,215 | * | 7/1990 | Fukushima et al. .................. 235/457 |
| 5,095,194 | * | 3/1992 | Barbanell ............................... 235/379 |
| 5,598,032 | * | 1/1997 | Fidalgo .................................... 257/679 |
| 5,671,525 | * | 9/1997 | Fidalgo ..................................... 29/600 |
| 5,822,190 | * | 10/1998 | Iwasaki ................................. 361/737 |
| 5,996,897 | * | 12/1999 | Prancz .................................... 235/492 |

FOREIGN PATENT DOCUMENTS

| | | | |
|---|---|---|---|
| 4328469A1 | 3/1995 | (DE) | ............... B42D/15/10 |
| 0548858A1 | 6/1993 | (EP) | ................ G06K/19/18 |
| 0636495A2 | 2/1995 | (EP) | ................. B41M/5/26 |
| 0709805A2 | 5/1996 | (EP) | ................ G06K/19/18 |

* cited by examiner

*Primary Examiner*—A. L. Wellington
*Assistant Examiner*—Monica S. Carter

(57) ABSTRACT

The invention relates to a data carrier (1) with a data carrier structure (2) in which a module (9) with a plate-shaped component carrier (10) and a component (13) attached to the inside of the component carrier (10) is used, and with a plate-shaped hologram carrier (30) provided on the data carrier (1) and showing a hologram (33) by way of the main surface (31) visible from outside the data carrier (1). The invention provides that the plate-shaped hologram carrier (30) be provided on the data carrier to be covering the plate-shaped component carrier (10), and covers at least substantially the component carrier (10).

7 Claims, 2 Drawing Sheets

DATA CARRIER WITH A MODULE AND A HOLOGRAM

FIELD OF THE INVENTION

The invention relates to a data carrier comprising a data carrier body bounded by a body surface and having a recess which terminates in said body surface and which accommodates a module, which comprises a plate-shaped component carrier having a first carrier main surface, which faces said body surface, and having a second carrier surface, which is remote from said body surface, and at least one component mounted on the component carrier in the area of the second carrier main surface which is remote from said body surface in the recess, covered by the component carrier, the data carrier having a plate-shaped hologram carrier, which carries a hologram on its main surface which is visible from outside the data carrier.

DESCRIPTION OF THE RELATED ART

Such a data carrier of the type defined in the opening paragraph and constructed as a chip card is commonly known and used in many variants, for example as a so-called credit card or bank card in banking transactions. In the known chip card the module, which is accommodated in the recess which terminates in a first body main surface, is disposed comparatively close to a short card edge of the chip card and the hologram carrier is disposed comparatively close to the opposite short card edge of the chip card. The known chip card and its module, accommodated in the recess, have been designed exclusively for contact-bound operation, for which purpose a chip carrier in the form of a plate-shaped component carrier has been provided with planiform connecting contacts on its externally accessible first carrier main surface, which contacts form a contact area whose surface shape corresponds to the cross-sectional area of the recess which terminates in the first carrier main surface. The planiform connecting contacts are wholly unprotected and exposed, as a result of which they can be damaged comparatively easily, which is undesirable in view of a trouble-free operation and also in view of a satisfactory appearance.

It is an object of the invention to preclude the aforementioned problems and to provide an improved data carrier. According to the invention, in order to achieve this object in a data carrier of the type defined in the opening paragraph, the plate-shaped hologram carrier is arranged on the data carrier so as to cover the plate-shaped component carrier of the module in the area of its carrier main surface which faces said body surface, and covers this plate-shaped component carrier at least for the greater part. In this way, it is achieved that the hologram carrier is utilized for covering the component carrier of a module accommodated in a recess of the data carrier, as a result of which the first carrier main surface of the component carrier is at least for the greater part protected and covered by means of the hologram carrier, thereby precluding damage to the component carrier, i.e. to components of the component carrier arranged in the area of the first main carrier surface of said component carrier. When the data carrier in accordance with the invention is a data carrier for contact-bound operation, in which case the module of the data carrier has planiform connecting contacts in the area of its first carrier main surface, the plate-shaped hologram carrier has partial passages or openings at given locations, through which contact pins of a read/write device can enter into electrically conductive contact with the planiform connecting contacts which are covered for the greater part by the hologram carrier.

In a data carrier in accordance with the invention it has proved to be advantageous if the data carrier comprises a plate-shaped hologram carrier which, already before the module is mounted in the recess of the data carrier, is connected to the plate-shaped component carrier of the module in the area of the first carrier main surface which faces said first body main surface, the main surface of the hologram carrier, which main surface carries a hologram, covering the first carrier main surface of the component carrier at least for the greater part. Such a construction of a data carrier in accordance with the invention is advantageous because the hologram carrier can already be connected to the component carrier of a module before this module is mounted in the recess of the data carrier.

However, in a data carrier in accordance with the invention it has also proved to be advantageous if the data carrier comprises a plate-shaped hologram carrier which, not until after this module has been mounted in the recess of the data carrier, is connected to at least the plate-shaped component carrier of this module in the area of the first carrier main surface which faces said first body surface, the main surface of the hologram carrier covering the first carrier main surface of the component carrier at least for the greater part. Such a construction of a data carrier in accordance with the invention has proved to be advantageous because the hologram carrier can then be connected to the component carrier of a module not until after this module has been mounted in the recess of the data carrier.

However, in a data carrier in accordance with the invention of the type defined in the preceding paragraph it has further proved to be advantageous if, with its main surface which carries a hologram, the plate-shaped hologram carrier projects from the first carrier main surface of the component carrier, which first carrier main surface faces said body surface, along the entire circumference of this first carrier main surface and is connected, in addition, to the data carrier body by its peripheral area. In this way, it is achieved that the hologram carrier is not only used for mechanical protection of the component carrier of the module of a data carrier in accordance with the invention but in addition has a sealing function, as a result of which a data carrier having a particularly well-protected module is realized.

An advantageous variant of a data carrier in accordance with the invention is characterized in that the data carrier is constructed exclusively for contactless operation, its module comprising a component carrier which is contactless in the area of its first carrier main surface. Such a data carrier has the advantage that it is simple and convenient to handle.

An advantageous variant of a data carrier in accordance with the invention as defined in the preceding paragraph is characterized in that, with its main surface which carries a hologram, the plate-shaped hologram carrier completely covers the first carrier main surface of the component carrier, which first carrier main surface faces said body surface. In this way, the component carrier is protected and covered in the area of its entire first carrier main surface, as a result of which a particularly good protection is achieved.

Data carriers in accordance with the invention can serve various purposes and can have various shapes, for example a key shape, a bar shape or other shapes. A highly preferred variant of a data carrier in accordance with the invention is characterized in that the data carrier is constructed as a chip card.

The above-mentioned aspects as well as further aspects of the invention will become apparent from the embodiments described hereinafter by way of examples and will be elucidated by means of these embodiments.

BRIEF DESCRIPTION OF THE DRAWINGS

The invention will now be described in more detail with reference to the drawings, which show three embodiments to which the invention is not limited.

DETAILED DESCRIPTION OF THE PREFERRED EMBODIMENT

Figure 1:
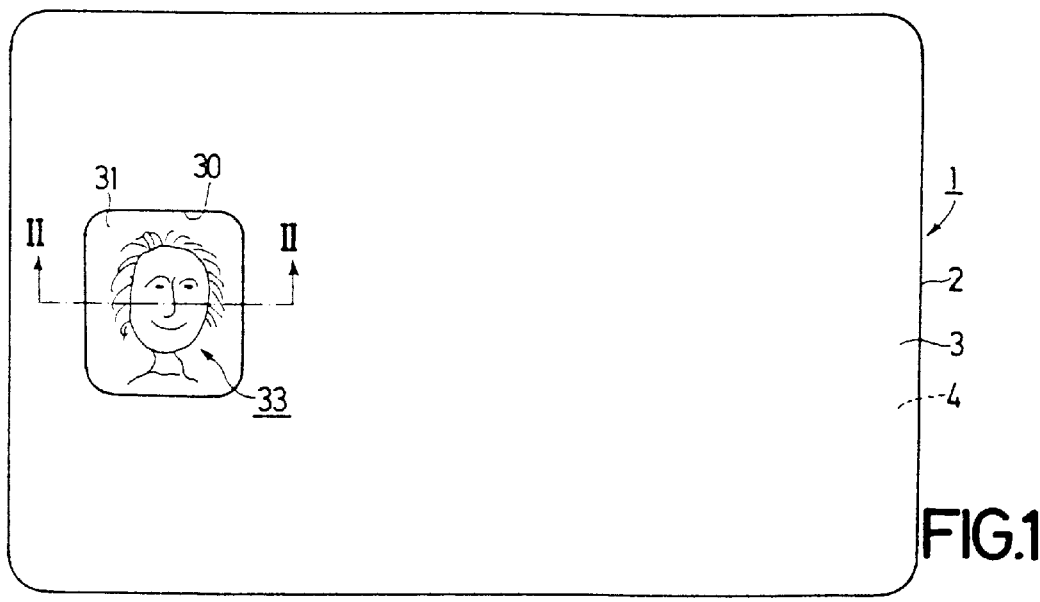
FIG. 1 is a plan view of a chip card forming a data carrier in accordance with an embodiment of the invention, constructed exclusively for contactless operation and including a module which comprises a plate-shaped chip carrier as the plate-shaped component carrier, a chip mounted as the component on the chip carrier, and a plate-shaped hologram carrier already connected to the plate-shaped chip carrier before the module is mounted in the chip card.
Figure 2:
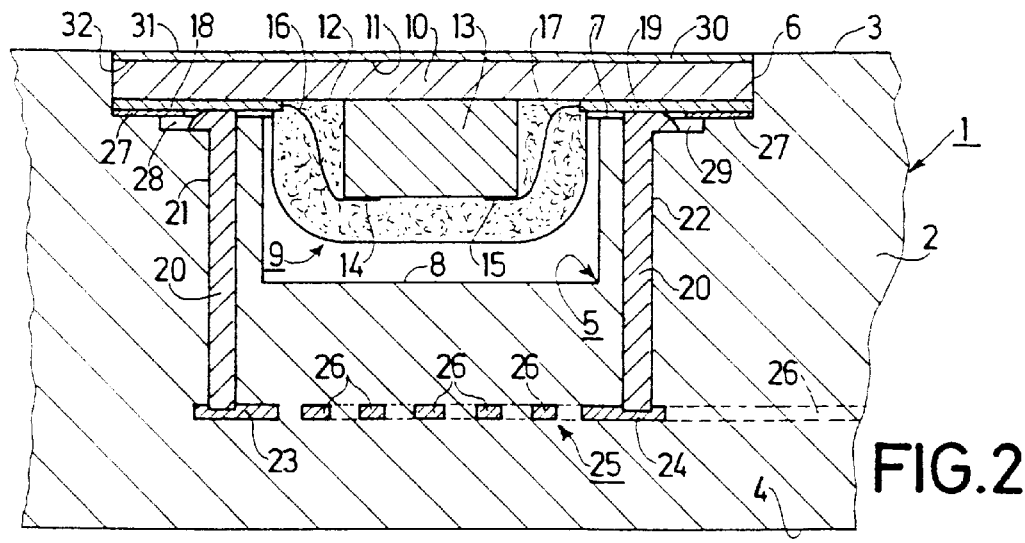
FIG. 2 is a cross-sectional view taken on the line II—II in FIG. 1 and shows a part of the chip card of FIG. 1 where the module mounted in the chip card is situated, on whose plate-shaped chip carrier the plate-shaped hologram carrier has been mounted, whose main surface has the same shape as the carrier main surfaces of the chip carrier.

FIGS. 1 and 2 show a chip card 1 forming a data carrier whose data carrier body is formed by a card body 2 manufactured in a lamination process. The card body 2 is bounded by, inter alia, a first body main surface 3 and a second body main surface 4. A stepped recess 5 is formed in the card body 5 by material removal. It is advantageous to form the stepped recess 5 in a milling operation, but it is also possible to use other suitable techniques, such as etching techniques or laser techniques. The stepped recess has a cross-sectionally larger first recess portion 6, which adjoins the first body main surface 3 and which is bounded, inter alia, by an annular bounding surface 7 parallel to the first body main surface 3, and a cross-sectionally smaller second recess portion 8, which adjoins the first recess portion 6 at the side thereof which is remote from the first body main surface 3. As is shown in FIG. 2, the recess 5 opens into said first body main surface 3.

The chip card 1 shown in FIGS. 1 and 2 is constructed exclusively for contactless operation. Therefore, a module 9 constructed exclusively for contactless operation is mounted in the stepped recess 5. The module 9 has a component carrier constituted by a plate-shaped chip carrier 10 which takes the form of a printed circuit board and which is bounded, inter alia, by a first carrier main surface 11, which faces said first body main surface 3, and a second carrier main surface 12, which is remote from said first body main surface 3. The module 9 further has a component constituted by a chip 13 mounted on the plate-shaped chip carrier 10 in the recess 5 in the area of the second carrier main surface 12 which is remote from said first body main surface 3, which chip is covered by the plate-shaped chip carrier 10. The chip carrier 10 may, in addition, carry further components. The chip 13 has two chip connecting contacts 14 and 15. The two chip connecting contacts 14 and 15, which are generally referred to as pads among experts, are connected in an electrically conductive manner to two plate-shaped module connecting contacts 18 and 19 via two so-termed bonding wires 16 and 17. The two module connecting contacts 18 and 19 are, for example, formed by conductor tracks provided on the printed circuit board forming the chip carrier 10. The two module connecting contacts 18 and 19 are connected to two coil connecting contacts 23 and 24 of a transmission/receiving coil 25 accommodated in the card body 2 via an electrically conductive adhesive 20 provided in channels 21 and 22 which partly traverse the card body 2. Suitably, the two channels 21 and 22, just as the stepped recess 5, are likewise formed in a milling operation. FIG. 2 further shows coil turns 26 of the transmission/receiving coil 25. The transmission/receiving coil 25 serves inter alia for the contactless inductive transmission of data between an external transmission/receiving device and the chip 13 incorporated in the chip card 1. The transmission/receiving coil 25 further serves for receiving a.c. signal used for deriving a direct voltage in the chip 13, which voltage powers the chip 13 so as to enable said transmission of data to the chip 13 and from the chip 13.

It is to be noted that in the chip card 1 in the area of the annular bounding surface 7 of the larger recess portion 6 a layer of a so-called hot-melt adhesive has been provided to form an adhesive bond between the second carrier main surface 12 of the chip carrier 10 and the card body 2, thereby securing the entire module 9 to the card body 2. Furthermore, it is to be noted that the two channels 21 and 22 each have a pocket 28 or 29, respectively, which extends in a lateral direction away from the respective channel 21 or 22, which pockets serve to take up a surplus of electrically conductive adhesive 20, as is shown diagrammatically in FIG. 2.

As is apparent from the above description, the chip card 1 as shown in FIGS. 1 and 2 exclusively permits a contactless operation of the chip, i.e. a data transfer to its chip 13 and from its chip 13, by means of the transmission/receiving coil 25, which is connected to the chip 13 in an electrically conductive manner. The chip card 1 and its module 9 are therefore constructed exclusively for contactless operation.

In the case of the chip card 1 shown in FIGS. 1 and 2, the chip card 1 further has a plate-shaped hologram carrier 30. The hologram carrier 30 has a first main surface 31 visible from outside the chip card 1 and a second main surface 32 opposite to the first main surface 31. On its first main surface 31, which is visible from outside the chip card 1, the hologram carrier 30 carries a hologram 33, which bears for example the image of a person, as is illustrated in FIG. 1.

In an advantageous manner, the plate-shaped hologram carrier 30 of the chip card 1 shown in FIGS. 1 and 2 is arranged on the chip card 1 in such a manner that the plate-shaped hologram carrier 30 covers the plate-shaped chip carrier 10 in the area of its first carrier main surface 11 which faces said first body main surface 3. In the present case, the plate-shaped hologram carrier 30 covers the plate-shaped chip carrier 10 completely. The plate-shaped hologram carrier 30 is connected to the chip carrier 10 by means of an adhesive bond, not shown separately in FIG. 2 and provided between its second main surface 32 and the first carrier main surface 11 of the chip carrier 10. Advantageously, the chip card 1 shown in FIGS. 1 and 2 comprises a plate-shaped hologram carrier 30, which is connected to the plate-shaped chip carrier 10 in the area of the first carrier main surface 11 which faces said first body main surface 3 already before the module 9 is mounted in the stepped recess 5 of the chip card 1. The two main surfaces 31 and 32 of the plate-shaped hologram carrier 30 have exactly the same outline as the first carrier main surface 11 of the chip carrier 10, which last-mentioned surfaces faces said first body main surface 3.

With the aid of the plate-shaped hologram carrier 30 of the chip card 1 shown in FIGS. 1 and 2 it is achieved in a very simple manner and without any additional means that in this chip card 1 the plate-shaped chip carrier 10 is covered completely in the area of its first carrier main surface 11 because the hologram carrier 30 is used for covering the chip carrier 10, as a result of which a chip card 1 for contactless operation is obtained in which the chip carrier is effectively protected in the area of its first carrier main surface 11 and which has an attractive and flawless appearance in the area of the chip carrier 10, which appearance is determined by the hologram on the hologram carrier 30.

Figure 3:
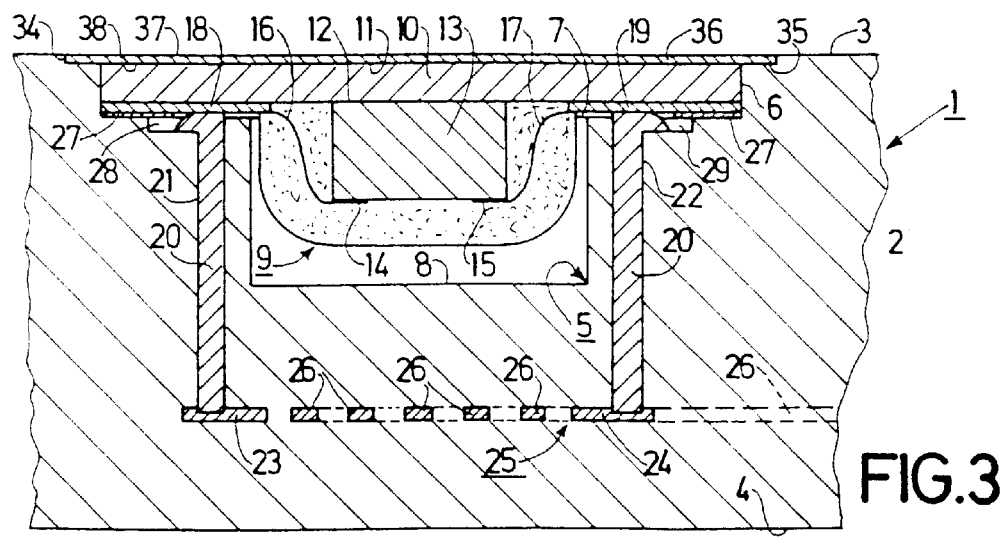
FIG. 3, in a manner similar to FIG. 2, shows a part of a chip card forming a data carrier in accordance with a second embodiment of the invention, constructed exclusively for contactless operation and including a module whose chip carrier, which forms the component carrier, is covered by a plate-shaped hologram carrier whose main surface projects from the facing carrier main surface of the chip carrier along the entire circumference of the last-mentioned surface.

FIG. 3 shows a chip card 1 forming a data carrier in accordance with a second embodiment of the invention. The chip card 1 shown in FIG. 3 has largely the same construction as the chip card 1 shown in FIGS. 1 and 2. An essential difference of the chip card 1 shown in FIG. 3 with the chip card 1 shown in FIGS. 1 and 2 is that in its area nearest the first body main surface 3 the stepped recess 5 has a third recess portion 34, which has also been formed in a milling operation. This third recess portion 34 is bounded by, inter alia, a further annular bounding surface 35 parallel to the first carrier main surface 3.

The chip card 1 shown in FIG. 3 comprises a plate-shaped hologram carrier 36 which, in the area of the first carrier main surface 11 of the chip carrier 10, which surface faces the body main surface 3, is connected to the card body 2 and the plate-shaped chip carrier 10 not until after the module 9 has been mounted in the recess 5 of the chip card 1. The hologram carrier 36 is bounded by a first main surface 37 and a second main surface 38. The hologram carrier 36 is connected to the card body 2 and the plate-shaped chip carrier 10 by an adhesive bond, not shown separately in FIG. 3, provided between, on the one hand, the second main surface 38 of said hologram carrier and, on the other hand, the annular bounding surface 35 of the third recess portion 34 and the first main surface 11 of the chip carrier 10. The two main surfaces 37 and 38 of the plate-shaped hologram carrier 36 project from the first carrier main surface 11 of the chip carrier 10, which first carrier main surface faces said first body main surface 3, along the entire circumference of this first carrier main surface 11, as is partly visible in FIG. 3.

In the case of the chip card 1 shown in FIG. 3 it again is achieved in a simple manner and substantially without any additional means that a chip card 1 for contactless operation is obtained in which the chip carrier 10 is effectively protected in the area of its first carrier main surface 11 and which has an attractive and flawless appearance in the area of the chip carrier 10. A further advantage of the chip card 1 shown in FIG. 3 is that the plate-shaped hologram carrier 36 is not only used for a proper mechanical protection of the chip carrier 10 and an attractive and flawless appearance of the chip card 1 in the area of the chip carrier 10 but the plate-shaped hologram carrier 36 in addition has a sealing function, as a result of which a particularly well-protected module 9 is realized.

Figure 4:
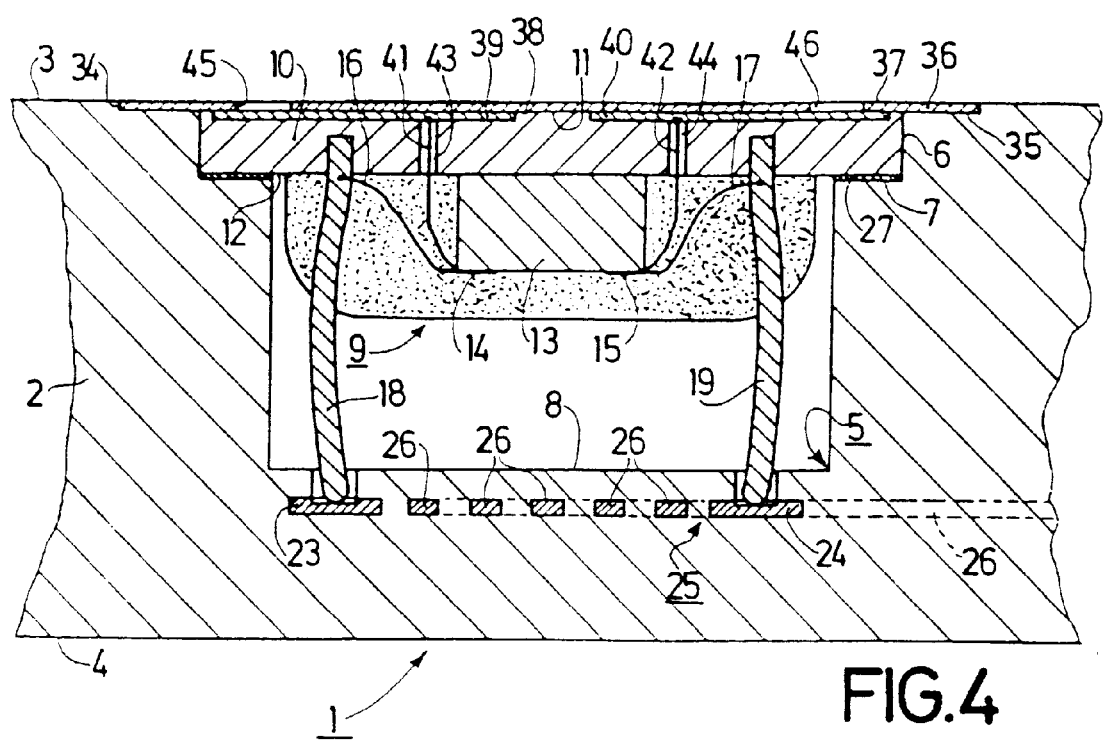
FIG. 4, in a manner similar to FIGS. 2 and 3, shows a part of a chip card forming a data carrier in accordance with a third embodiment of the invention, constructed both for contact-bound operation and for contactless operation and including a module whose chip carrier, which forms the component carrier, is covered by a plate-shaped hologram carrier whose main surface projects from the facing carrier main surface of the chip carrier along the entire circumference of the last-mentioned surface.

FIG. 4 shows a chip card 1 forming a data carrier in accordance with a third embodiment of the invention. The module 9 of this chip card 1 comprises two elastically compliant pin-shaped module connecting contacts 18 and 19 fitted in the chip carrier 10, the nominal length of these contacts being selected in such a manner that owing to their elasticity the two module connecting contacts 18 and 19 are bent and under the influence of their elasticity are in electrically conductive contact with the two coil connecting contacts 23 and 24 of the coil 25.

In the chip card 1 shown in FIG. 4 further module connecting contacts provided in the area of its first carrier main surface 11 of the chip carrier are connected to the chip carrier 10 of the module 9 and are adapted to cooperate with mating contacts which can be brought into contact engagement from outside the chip card 1. The chip card 1 shown in FIG. 4 comprises eight of such further module connecting contacts in total but FIG. 4 shows only two further module connecting contacts 39 and 40. The further module connecting contacts—as can be seen for the two further module connecting contacts 39 and 40 in FIG. 4—are connected to further chip connecting contacts (pads) of the chip 13 via further bonding wires, of which the two further bonding wires 41 and 42 are shown in FIG. 4. The further bonding wires are passed through bores formed in the chip carrier 10, two of said bores 43 and 44 being shown in FIG. 4.

The chip 13 forming the component of the chip card 1 shown in FIG. 4 is a so-called dual-purpose chip, whose module connecting contacts 18 and 19 arranged in the area of the second carrier main surface 12 are connected to the coil connecting contacts 23 and 24 of the coil 25, which serves for the contactless data exchange between the dual-purpose chip and a write/read station and, if applicable, for the contactless energy transfer to the dual-purpose chip, which has further module connecting contacts arranged in the area of the first carrier main surface 11 for the contact-bound data exchange between the dual-purpose chip and a write/read station and for the contact-bound energy transfer to the dual-purpose chip.

The chip card 1 shown in FIG. 4, similarly to the chip card shown in FIG. 3, comprises a plate-shaped hologram carrier 36 which is connected to the card body 2 and the plate-shaped chip carrier 10 not until after the module 9 has been mounted in the recess 5 of the chip card 1 in the area of the first carrier main surface 11 of the chip carrier, which first carrier main surface faces said first body main surface 3. The hologram carrier 36 is bounded by a first main surface 37 and a second main surface 38. On its first main surface 37, which is visible from outside the chip card 1, the hologram carrier 36 carries a hologram, which is not shown in FIG. 4. The hologram carrier 36 is attached to the card body 2 and the plate-shaped chip carrier 10 by means of an adhesive bond, not shown separately in FIG. 4, provided between, on the one hand, the second main surface 38 of said hologram carrier and, on the other hand, the annular bounding surface 35 of the third recess portion 34 and first main surface 11 of the chip carrier 10. The adhesive bond, not shown, between the card body 2 and the plate-shaped chip carrier 10 is an adhesive bond formed during an embossing operation. Said embossing operation serves for attaching the hologram carrier 36 to the chip card 1, the third recess portion 34 in the present case also being formed during this embossing operation.

In the chip card 1 shown in FIG. 4 the two main surfaces 37 and 38 of the plate-shaped hologram carrier 36 project from the first carrier main surface 11 of the chip carrier 10, which surface faces said first body main surface 3, along the entire circumference of this first carrier main surface 11, as is partly visible in FIG. 4. In this way, it is achieved that in the chip card 1 shown in FIG. 4 the plate-shaped hologram carrier 36 is not only used for a proper mechanical protection of the chip carrier 10 and the parts arranged in the area of the first carrier main surface 11, i.e. the further module connecting contacts of the chip carrier 10, and for an attractive and flawless appearance of the chip card 1 in the area of the chip carrier 10, but the plate-shaped hologram carrier 36 in addition has a sealing function, as a result of which a particularly well-protected module 9 is realized.

In the chip card shown in FIG. 4 the plate-shaped hologram carrier 36 has passages, of which two passages 45 and 46 are shown in FIG. 4. The passages in the plate-shaped hologram carrier 36 provide access to the further module connecting contacts, so that through these passages contact pins of a read/write device can enter into electrically conductive contact with the planiform further module connecting contacts which are covered for the greater part by the plate-shaped hologram carrier 36.

The invention is not limited to the three embodiments described hereinbefore by way of examples. The invention can also be applied to a chip card constructed only for contact-bound operation and for this purpose has a module for realizing contact-bound operation, the plate-shaped chip carrier of the module for realizing contact-bound operation then being covered by the plate-shaped hologram carrier. A plate-shaped hologram carrier need not necessarily cover the underlying chip carrier completely but may expose a narrow peripheral area of the chip carrier for optical reasons. The invention can also be applied to a data carrier having an injection-molded data carrier body. Furthermore, it is to be noted that in addition to the plate-shaped hologram carrier, which covers the plate-shaped component carrier at least for the greater part, a data carrier in accordance with the invention may also comprise at least one further hologram carrier.

What is claimed is:

1. A data carrier comprising a data carrier body bounded by a body surface and having a recess which terminates in said body surface and which accommodates a module, which comprises a plate-shaped component carrier having a first carrier main surface, which faces said body surface, and having a second carrier surface, which is remote from said body surface, and at least one component mounted on the component carrier in the area of the second carrier main surface which is remote from said body surface in the recess, covered by the component carrier, the data carrier having a plate-shaped hologram carrier, which carries a hologram on its main surface which is visible from outside the data carrier, wherein the plate-shaped hologram carrier is arranged on the data carrier so as to cover the plate-shaped component carrier of the module in the area of its carrier main surface which faces said body surface, and covers this plate-shaped component carrier at least for the greater part.

2. A data carrier as claimed in claim 1, wherein the data carrier comprises a plate-shaped hologram carrier which, already before the module is mounted in the recess of the data carrier, is connected to the plate-shaped component carrier of the module in the area of the first carrier main surface which faces said first body main surface, the main surface of the hologram carrier, which main surface carries a hologram, covering the first carrier main surface of the component carrier at least for the greater part.

3. A data carrier as claimed in claim 1, wherein the data carrier comprises a plate-shaped hologram carrier which, not until after this module has been mounted in the recess of the data carrier, is connected to at least the plate-shaped component carrier of this module in the area of the first carrier main surface which faces said first body surface, the main surface of the hologram carrier covering the first carrier main surface of the component carrier at least for the greater part.

4. A data carrier as claimed in claim 3, wherein with its main surface which carries a hologram, the plate-shaped hologram carrier projects from the first carrier main surface of the component carrier, which first carrier main surface faces said body surface, along the entire circumference of this first carrier main surface and is connected, in addition, to the data carrier body by its peripheral area.

5. A data carrier as claimed in claim 1, wherein the data carrier is constructed exclusively for contactless operation, its module comprising a component carrier which is contactless in the area of its first carrier main surface.

6. A data carrier as claimed in claim 5, wherein with its main surface which carries a hologram, the plate-shaped hologram carrier completely covers the first carrier main surface of the component carrier, which first carrier main surface faces said body surface.

7. A data carrier as claimed in claim 1, wherein the data carrier is constructed as a chip card.

* * * * *